United States Patent
Otsuki

(10) Patent No.: US 8,118,437 B2
(45) Date of Patent: Feb. 21, 2012

(54) OPTICAL DEVICE AND PROJECTOR

(75) Inventor: Nobuyuki Otsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 459 days.

(21) Appl. No.: 12/207,794

(22) Filed: Sep. 10, 2008

(65) Prior Publication Data
US 2009/0086172 A1 Apr. 2, 2009

(30) Foreign Application Priority Data
Sep. 28, 2007 (JP) ................................ 2007-254565

(51) Int. Cl.
*G03B 21/14* (2006.01)
(52) U.S. Cl. .............. 353/119; 353/30; 353/31; 353/20; 353/81; 353/94; 353/100; 353/122; 349/5; 349/7; 349/8; 349/9; 349/57
(58) Field of Classification Search ............. 353/30, 353/31, 33, 20, 81, 94, 100, 119, 122; 359/831, 359/494, 495, 496, 497, 498; 349/5, 7, 8, 349/9, 57, 58
See application file for complete search history.

(56) References Cited

U.S. PATENT DOCUMENTS

| | | | | |
|---|---|---|---|---|
| 6,095,653 A * | 8/2000 | Yajima | ............ | 353/33 |
| 6,814,449 B2 * | 11/2004 | Yamada et al. | ............ | 353/74 |
| 6,846,079 B2 * | 1/2005 | Ogawa et al. | ............ | 353/20 |
| 6,903,827 B2 * | 6/2005 | Kitabayashi et al. | ......... | 356/614 |
| 6,935,753 B2 * | 8/2005 | Takezawa et al. | ............ | 353/119 |
| 6,981,772 B2 * | 1/2006 | Kim | ............ | 353/81 |
| 7,118,222 B2 * | 10/2006 | Kitabayashi | ............ | 353/52 |
| 7,147,333 B2 * | 12/2006 | Shirota | ............ | 353/81 |
| 7,532,407 B2 | 5/2009 | Hirata et al. | | |
| 7,845,803 B2 * | 12/2010 | Lv et al. | ............ | 353/52 |
| 2004/0021835 A1 * | 2/2004 | Yamada et al. | ............ | 353/74 |
| 2004/0032569 A1 * | 2/2004 | Takezawa et al. | ............ | 353/31 |
| 2005/0012910 A1 * | 1/2005 | Fujimori et al. | ............ | 353/119 |
| 2005/0185145 A1 * | 8/2005 | Halsberghe et al. | ............ | 353/33 |
| 2009/0207381 A1 | 8/2009 | Hirata et al. | | |

FOREIGN PATENT DOCUMENTS

| | | |
|---|---|---|
| JP | 2000-258840 | 9/2000 |
| JP | 2003-330105 A | 11/2003 |
| JP | 2004-354795 A | 12/2004 |
| JP | 2006-301424 A | 11/2006 |
| JP | 2007-047408 A | 2/2007 |

* cited by examiner

*Primary Examiner* — Georgia Y Epps
*Assistant Examiner* — Sultan Chowdhury
(74) *Attorney, Agent, or Firm* — AdvantEdge Law Group, LLC

(57) ABSTRACT

An optical device that includes a light modulation device, a projection optical device, and a retention member that holds the light modulation device and the projection optical device. The retention member includes: a projection optical device attachment section for attach the projection optical device; and a light modulation device attachment section that is provided for attachment of the light modulation device with a protrusion to a side opposite to the projection optical device along an optical-axis direction of the projection optical device, and the projection optical device attachment section includes: a fixing section that fixes the projection optical device substantially at a position of the center of gravity; a support section that is disposed opposing the fixing section in the optical-axis direction, and supports the light modulation device attachment section; and a connection section that connects together the fixing section and the support section.

10 Claims, 6 Drawing Sheets

OPTICAL DEVICE AND PROJECTOR

BACKGROUND

1. Technical Field

The present invention relates to an optical device and a projector.

2. Related Art

A previously well-known projector is provided with a light modulation device, a projection optical device, and a retention member. The light modulation device modulates lights of three colors of RGB (Red, Green, and Blue) in accordance with image information on a color light basis. The projection optical device magnifies and projects image lights as a result of modulation by the light modulation device, and the retention member keeps hold of the light modulation device and the projection optical device. An example includes Patent Document 1 (JP-A-2000-258840).

With such a projector of Patent Document 1, a prism unit, i.e., light modulation device, is disposed on the bottom surface of a head body, i.e., retention member, shaped substantially like a letter L when viewed from the side, and the bottom surface of the head body is fixed to a lower case. The head body is fixed with, on its side surface, a projection lens, i.e., projection optical device, so that the space between the prism unit and the projection lens is kept substantially constant, and their optical axes are substantially matched.

The concern here is the heavy weight of the projection lens, and with the projector of Patent Document 1, when the head body keeping hold of the prism unit and the projection lens is under a large force due to the self weight of the projection lens or an impact applied to the projector, for example, there is a risk that the head body would be deformed. If the head body is deformed as such, because the prism unit is disposed on the bottom surface of the head body fixed to the lower case, the space between the prism unit and the projection lens may show a change, or some skewness may be observed between their optical axes. As a result, the projector may be problematically deteriorated in terms of optical capabilities. Especially when the projector is of a short-range type with a wide-angle projection lens, the optical capabilities are easily influenced by the skewness of the optical axes between the light modulation device and the projection lens. Therefore, such a problem of deterioration of the optical capabilities becomes obvious.

SUMMARY

An advantage of some aspects of the invention is to provide an optical device that can, even when a retention member is deformed, keep substantially constant a space between a light modulation device and a projection optical device, and can find a substantial matching between their optical axes, and a projector.

A first aspect of the invention is directed to an optical device that includes a light modulation device that modulates a light beam emitting from a light source to an image light in accordance with image information, and a projection optical device that magnifies and projects the image light. The optical device is provided with a retention member that holds the light modulation device and the projection optical device. The retention member includes: a projection optical device attachment section for attachment of the projection optical device; and a light modulation device attachment section that is provided for attach the light modulation device with a protrusion to a side opposite to the projection optical device along an optical-axis direction of the projection optical device. The projection optical device attachment section includes: a fixing section that fixes the projection optical device substantially at a position of the center of gravity; a support section that is disposed opposing the fixing section in the optical-axis direction, and supports the light modulation device attachment section; and a connection section that connects together the fixing section and the support section.

In the retention member, the light modulation device attachment section may be configured integrally with the projection optical device attachment section or may be configured separately therefrom. When these components are configured separately from each other, the light modulation device attachment section may be attached to the projection optical device attachment section to be integrated therewith by a screw or using an adhesive, for example. That is, the support section in the projection optical device serves well as long as it supports the light modulation device attachment section.

With such a configuration, the retention member is provided with the projection optical device attachment section and the light modulation device attachment section, and the projection optical device attachment section is provided with the fixing section, the support section, and the connection section. As such, even if the fixing section is deformed due to the self weight of the projection lens or an impact applied to the projector, for example, the light modulation device attachment section can follow the deformation of the fixing section via the connection section and the support section. This thus enables to keep substantially constant the space between the light modulation device and the projection optical device, and to find a substantial matching between their optical axes. When the retention member is fixed to the chassis of an optical device or to the external chassis of a projector or others equipped with an optical device, any portion not the light modulation device attachment section, e.g., the projection optical device attachment section, may be fixed to the chassis of the optical device or to the external chassis of the projector or others.

In the above configuration, the fixing section fixes the projection optical device substantially at a position of the center of gravity. This thus reduces a force to be applied to the fixing section due to the self weight of the projection lens or due to an impact applied to the projector, for example so that the amount of deformation of the fixing section can be favorably reduced.

In the optical device of the first aspect of the invention, preferably, the fixing section is shaped substantially like a rectangular frame having two sides directed along a vertical direction, and the connection section extends from the two sides to a side of the support section, and is formed substantially like a rectangular plate having a side connecting together an upper end of the fixing section and an upper end of the support section.

Herein, the force to be applied to the fixing section due to the self weight of the projection lens is the one pulling the upper end of the fixing section to the tip end side of the projection optical device in the projection direction, or the one pushing the upper end of the fixing section to the base end side of the projection optical device in the projection direction.

With such a configuration, the connection section is formed substantially like a rectangular plate whose one side is directed along the vertical direction, and another side connects the upper end of the fixing section and the upper end of the support section, thereby being able to transmit the force applied on the upper end of the fixing section to the support section without fail. This thus enables, without fail, the light modulation device attachment section to follow any deformation of the fixing section via the connection section and the support section so that the space can be kept substantially constant between the light modulation device and the projection optical device, and their optical axes can be substantially matched.

In the optical device of the first aspect of the invention, preferably, the projection optical device is fixed to the fixing section with a screw along the optical-axis direction.

When the projection optical device is screw-fixed to the fixing section along the direction substantially orthogonal to the optical-axis direction of the projection optical device, the space between the light modulation device and the projection optical device will be easily changed due to the variations of the screw hole and the screw.

In the first aspect of the invention, however, the projection optical device is screw-fixed to the fixing section along the optical-axis direction of the projection optical device, thereby being able to keep substantially constant the space between the light modulation device and the projection optical device.

In the optical device of the first aspect of the invention, preferably, the light modulation device attachment section is configured separately from the projection optical device attachment section.

With such a configuration, after being attached with the light modulation device, the light modulation device attachment section can be supported by the support section in the projection optical device attachment section. As such, the retention member can be increased in manufacturing efficiency, and by extension, the optical device can be increased in manufacturing efficiency.

In the optical device of the first aspect of the invention, preferably, the light modulation device attachment section is supported by the support section by being screw-fixed along the optical-axis direction.

With such a configuration, the light modulation device attachment section is supported by the support section by being screw-fixed along the optical-axis direction of the projection optical device, thereby being able to keep substantially constant the space between the light modulation device and the projection optical device.

A second aspect of the invention is directed to a projector including the optical device described above.

With such a configuration, the effects similar to those achieved by the optical device described above can be achieved. Moreover, with the optical device provided as such, even if the retention member is deformed, the space between the light modulation device and the projection optical device can be kept substantially constant, and their optical axes can be substantially matched. As a result, the projector can be prevented from being deteriorated in optical capabilities.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
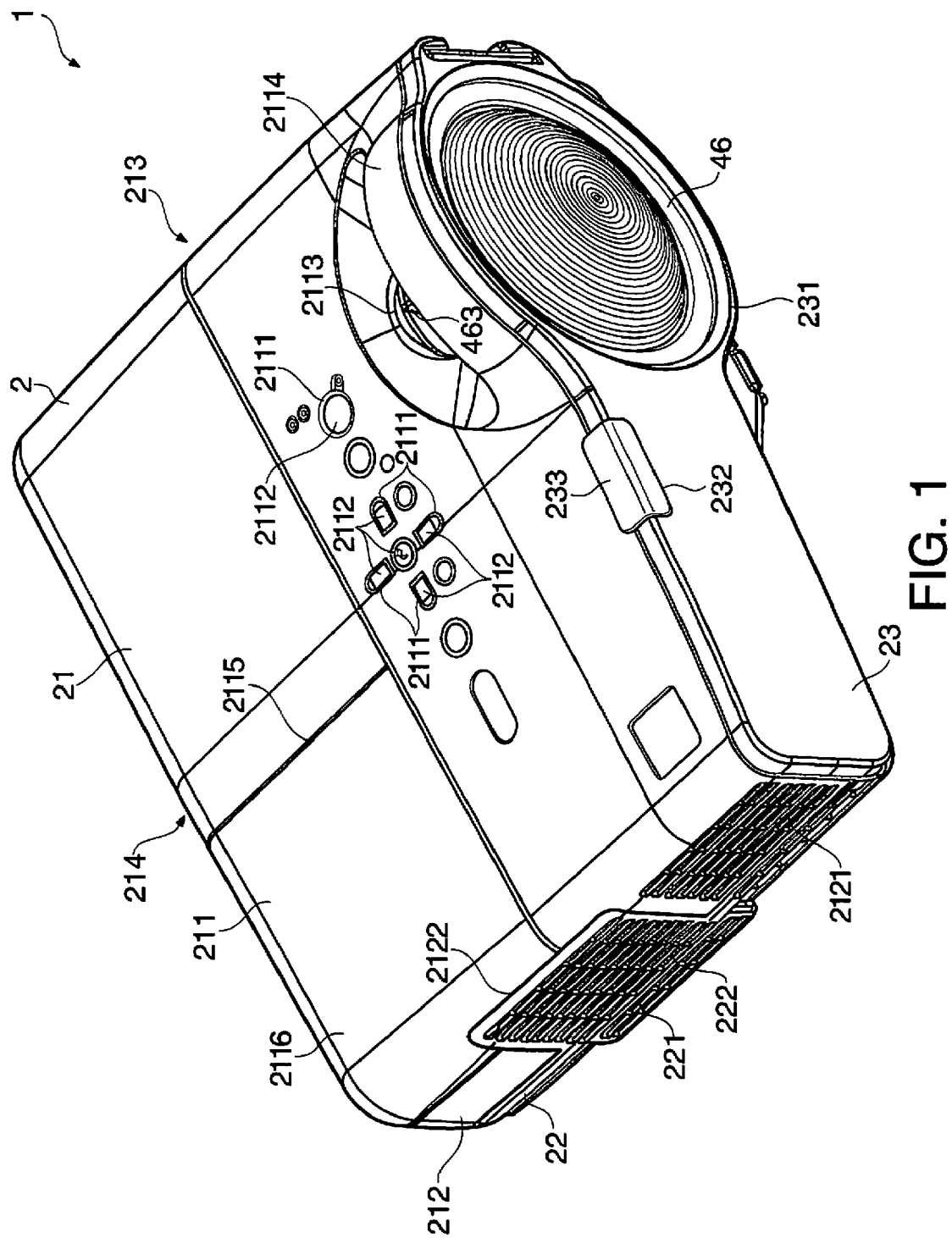
FIG. 1 is a perspective view of a projector of an embodiment of the invention, viewed from the front side.

In the below, embodiments of the invention are described with reference to the accompanying drawings.
External Configuration or Projector FIG. 1 is a perspective view of a projector 1 of this embodiment, viewed from the front surface side.

The projector 1 of this embodiment serves to form an image light in accordance with image information coming from an external device or others, and project the image light onto a projection surface such as screen. As shown in FIG. 1, such a projector 1 is configured to include an external chassis 2, and a device body 3 (not shown in FIG. 1). The device body 3 is housed in the external chassis 2.
Configuration of External Chassis The external chassis 2 is shaped substantially like a rectangular parallelepiped in its entirety, and is made of synthetic resin in this embodiment. This external chassis 2 is configured to include an upper case 21, a lower case 22, and a front case 23. The upper case 21 forms the upper surface, i.e., the surface located on the upper side in the vertical direction, and the lower case 22 forms the lower surface, i.e., the surface located on the lower side in the vertical direction. The front case 23 forms the front surface, i.e., the side for image light projection by a projection lens 46 that will be described later.

Although not shown in detail, from the bottom surface of the lower case 22, a leg section is protruded for placement of the projector 1 on the placement surface.

The upper case 21 looks substantially like a U-shape in vertical cross section, including an upper surface section 211, right and left side surface sections 212 and 213, and a rear surface section 214. The side surface sections 212 and 213 are both substantially sagging from the upper surface section 211.

The upper surface section 211 is formed with a plurality of openings 2111 substantially at the center, and from these openings 2111, a plurality of keys 2112 are respectively exposed. The keys 2112 are those provided on an operation panel for operating the projector 1, and include a power key, a direction key, an enter key, and others. The power key is used to turn ON and OFF the projector 1, and the direction key and the enter key are used for adjustment of any trapezoidal deformation, and for item selection on a menu screen, for example.

On the front surface side of the upper surface section 211, i.e., on the side proximal to the front case 23, an opening 2113 and a bulge section 2114 are formed. At an area corresponding to the area formed with the opening 2113 and the bulge section 2114 in the external chassis 2, the projection lens 46 is provided, and from the opening 2113, a knob 463 is exposed. The knob 463 is the one provided to the projection lens 46 for zooming and focus adjustment. The bulge section 2114 is so formed as to bulge toward the outside of the surface in accordance with the shape of the projection lens 46.

The upper surface section 211 is also formed with, on the rear surface side, an opening 2115 for use to exchange a light source device 411 that will be described later. The opening 2115 is shaped substantially like a rectangle, and is covered by a cover 2116.

One of the side surface sections 212 and 213 located on the left side when the projector 1 is viewed from the front surface side (on the left side in FIG. 1), i.e., side surface section 212, is formed with a first exhaust port 2121, and a notch 2122. The first exhaust port 2121 is shaped like a slit from which the air inside of the external chassis 2 is exhausted to the outside, and the notch 2122 is shaped substantially like a rectangle.

When the upper case 21 and the lower case 22 are combined together, the notch 2122 is fit with an exhaust section 221 formed to the lower case 22. This exhaust section 221 is formed with a second exhaust port 222 shaped like a slit, and via this exhaust port 222, the air inside of the external chassis 2 is exhausted by a fan 63 (refer to FIG. 2) provided inside.

Although not shown, the side surface section 213 formed on the side opposite to the side surface section 212 is formed with an intake port for guiding the outside air into the external chassis 2.

The front case 23 is formed with an opening 231 on the side of the side surface section 213. The opening 231 is shaped substantially like a circle, and from which the projection lens 46 is exposed. On the substantially upper center side of the front case 23, an opening 232 is formed by combination of the upper case 21. The opening 232 is shaped substantially like a rectangle, and is covered by a cover 233. Although not shown, the opening 232 is formed therein with a light-receiving section for receiving infrared signals coming from a remote controller (not shown).

Configuration of Device Body

Figure 2:
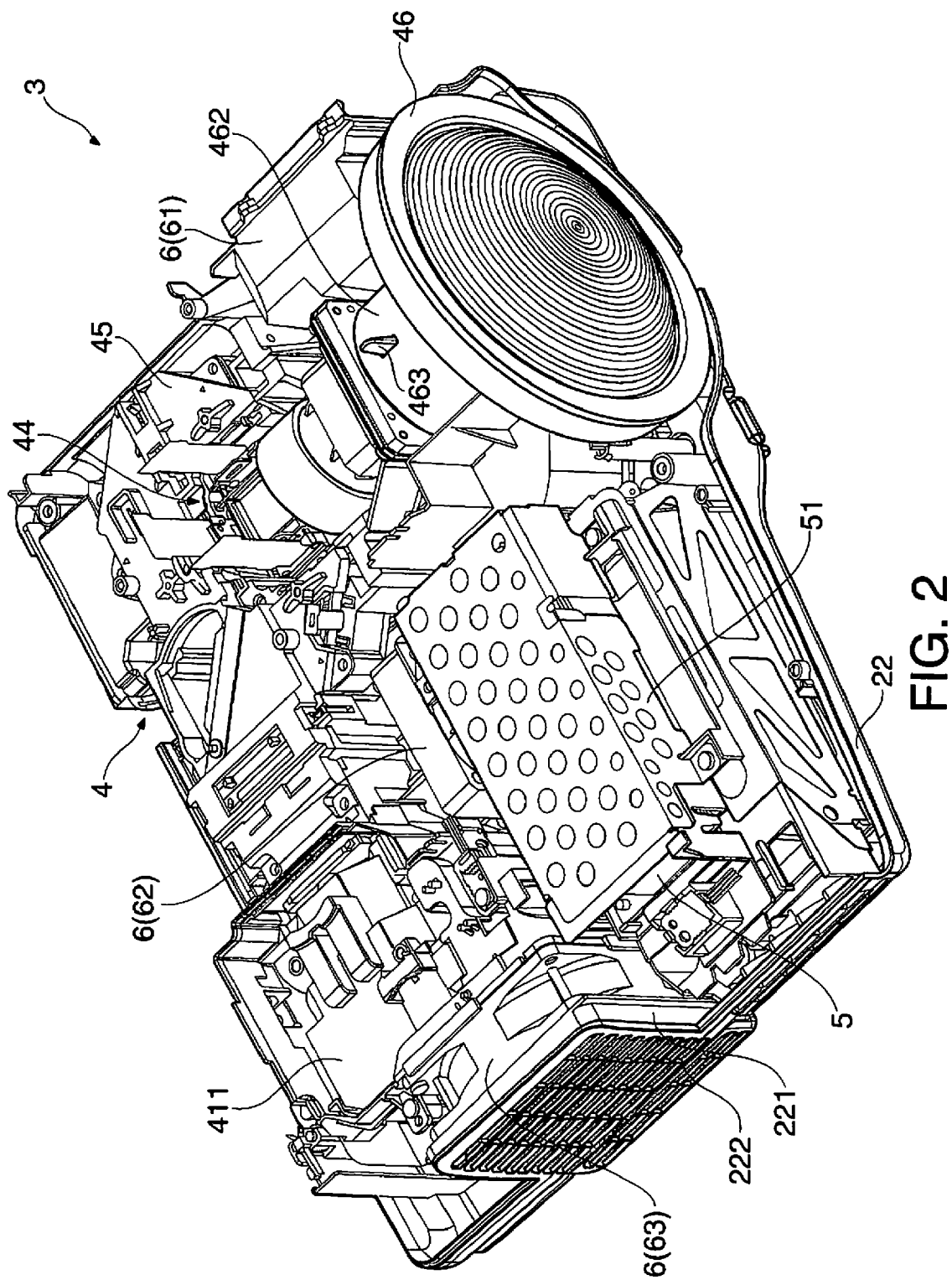
FIG. 2 is a perspective view of a device body of the projector of the embodiment.

FIG. 2 is a perspective view of the device body 3. In other words, FIG. 2 is a perspective view of the projector 1 not including the upper case 21 and the front case 23 unlike that in FIG. 1.

The device body 3 serves to process image information coming from an external device or others, and form and project image lights in accordance with the image information. The device body 3 is fixed to the lower case 22, and as shown in FIG. 2, is configured to include an optical device 4, a power device 5, a cooling device 6, and a control device (not shown).

Among these components, the power device 5 is disposed along the front surface of the device body 3, and makes an electric supply to the electronic components configuring the projector 1. To make such an electric supply, the power device 5 subjects a commercial alternating current provided from outside to DC (Direct Current) conversion, and then the voltage is stepped up or down. This power device 5 is covered therearound by an electromagnetic shielding material 51, thereby taking care of EMI (Electro Magnetic Interference).

The cooling device 6 is provided for cooling the components, i.e., the optical device 4, the power device 5, and the control device, using the air directed from the outside of the external chassis 2 via an intake port (not shown) of the side surface section 213. The air used for cooling the components as such is exhausted to the outside via the first and second exhaust ports 2121 and 222. This cooling device 6 is configured by a duct 61, and a plurality of fans.

The duct 61 is connected to the intake port (not shown) of the side surface section 213, and using a fan (not shown) located below the duct 61, the air for cooling directed from the outside of the external chassis 2 is directed to liquid crystal panels 441 or others of the optical device 4, which will be described later.

A fan 62 disposed in the vicinity of the power device 5 intakes a part of the cooling air inside of the external chassis 2, and makes the cooling air to flow through the power device 5. The air is then exhausted from the first exhaust port 2121.

A fan 63 connected to the exhaust section 221 intakes the air used for cooling the device body 3, and exhausts the air to the outside of the external chassis 2 via the second exhaust port 222.

The control device controls the projector 1 in terms of operation, e.g., executes a process in accordance with an input operation made to any of the keys 2112 of the operation panel described above. The control section also processes incoming image information, and outputs an image signal corresponding to the image information to the liquid crystal panels 441 of the optical device 4 that will be described later. Although not shown in detail, the control device is configured as a circuit board carrying thereon a CPU (Central Processing Unit) or others, and is disposed above the optical device 4.

Configuration of Optical Device

Figure 3:
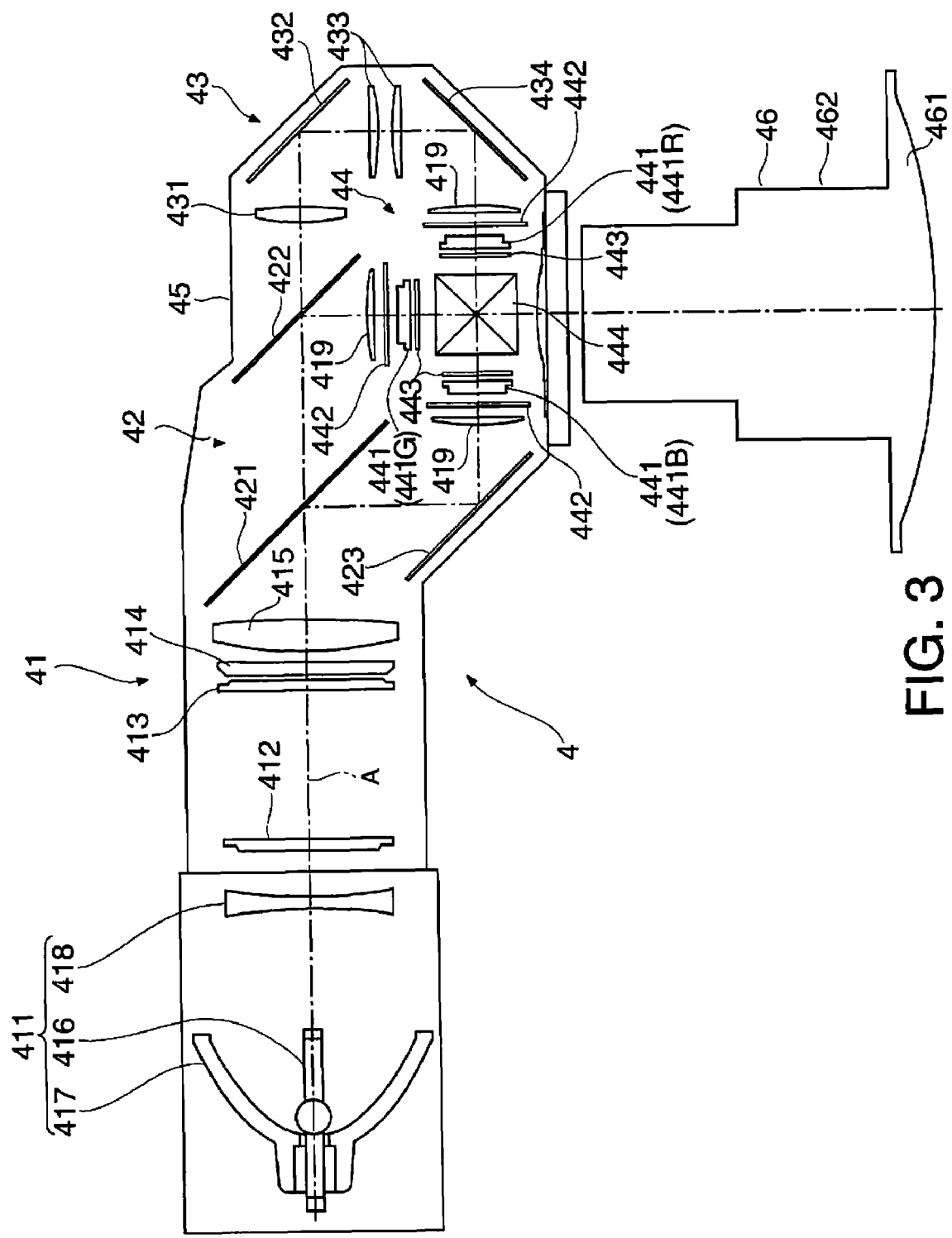
FIG. 3 is a schematic diagram showing an optical system of an optical device in the embodiment.

FIG. 3 is a schematic diagram showing an optical system of the optical device 4.

The optical device 4 forms an image light corresponding to the image signal coming from the control device described above, and projects the image light onto the projection surface. This optical device 4 extends along the rear surface of the external chassis 2 (the rear surface section 214), and looks substantially like a letter L in planar view, i.e., extends along the side surface of the external chassis 2 (the side surface section 213).

As shown in FIG. 3, such an optical device 4 is configured to include an illumination optical device 41, a color separation optical device 42, a relay optical device 43, a light modulation device 44, an optical-member chassis 45, and the projection lens 46. The optical-member chassis 45 carries therein the components 41 to 44, and the projection lens 46 is attached to the optical-member chassis 45.

The illumination optical device 41 is configured to include the light source device 411, first and second lens arrays 412 and 413, a polarization conversion element 414, and a superimposing lens 415.

The light source device 411 is configured to include a light source lamp 416, a reflector 417, and a collimating concave lens 418. The light source lamp 416 emits radiation beam, and the reflector 417 reflects the radiant light emitted from the light source lamp 416 and converges the light at any predetermined position. The collimating concave lens 418 collimates the light beam as a result of convergence by the reflector 417 with respect to an illumination optical axis A. Such a light source lamp 416 is exemplified by a halogen lamp, a metal halide lamp, a high-pressure mercury lamp, and others. The reflector 417 can be configured by an ellipsoidal reflector having a rotating ellipsoidal surface, or by a parabolic reflector having a rotating parabolic surface. If this is the configuration, the collimating concave lens 418 is not necessarily provided.

The first and second lens arrays 412 and 413 are each of a configuration including small lenses arranged in a matrix. The first lens array 412 divides a light beam coming from the light source device 411 into a plurality of partial light beams, and forms an image in the vicinity of the second lens array 413.

The second lens array 413 works together with the superimposing lens 415 located on the downstream of the second lens array 413 on an optical path, and performs image formation to images emitted from the small lenses of the first lens array 412. The image formation is performed at an image forming area of each of the liquid crystal panels 441 in the light modulation device 44 that will be described later.

The polarization conversion element 414 converts the partial light beam provided by the second lens array 413 into linear polarized lights substantially of a kind.

The color separation optical device 42 is configured to include two dichroic mirrors 421 and 422, and a reflection mirror 423. The color separation optical device 42 separates the partial light beams coming from the illumination optical device 41 into lights of three colors of red (R), green (G), and blue (B). Out of the lights of three colors being the separation results by the color separation optical device 42, the lights of green and blue are respectively directed into light incident-side polarizers 442 for the lights of green and blue via a condenser lens 419. The light of red is directed to the light incident-side polarizer 442 for the light of red via the relay optical device 43 and the condenser lens 419.

The relay optical device 43 serves to guide the light of red being the separation result by the color separation optical device 42 to a liquid crystal panel 441R for the light of red, which will be described later. The relay optical device 43 is configured to include a light incident-side lens 431, a relay lens 433, and reflection mirrors 432 and 434. The reason of such a relay optical device 43 being disposed on the optical path for the lights of red is the length difference of the optical path, i.e., the optical path for the lights of red is longer in length than the optical paths for the other lights of colors, thereby preventing reduction of the light use efficiency due to light diffusion or others. Herein, the relay optical device 43 is so configured as to pass only the lights of red, but alternatively, may be so configured as to pass the lights of blue, for example.

The light modulation device 44 modulates an incoming light beam in accordance with an image signal, and forms an image light related to a color image. Such a light modulation device 44 is configured to include the three liquid crystal panels 441, three light incident-side polarization panels 442, three light exiting-side polarizers 443, and a cross dichroic prism 444. The three liquid crystal panels 441 include the liquid crystal panel 441R on the side of the lights of red, a liquid crystal panel 441G on the side of the lights of green, and a liquid crystal panel 441B on the side of the lights of blue. The light incident-side polarizers 442 are respectively disposed on the light incident sides of the liquid crystal panels 441, and the light exiting-side polarizers 443 are respectively disposed on the light exiting-side of the liquid crystal panels 441.

Out of the color lights being the separation results by the color separation optical device 42, the three light incident-side polarizers 442 each pass only polarized lights having substantially the same polarization direction as that aligned by the polarization conversion element 414, and absorb the remaining light beams.

The three liquid crystal panels 441 are each of a configuration including a pair of transparent glass substrates, and a liquid crystal material being an electrooptic material is airtightly sealed therebetween. Through control over the state of orientation of the liquid crystal material in accordance with incoming image information, the liquid crystal panels 441 each modulate the polarization direction of the polarized lights emitted from the light incident-side polarizers 442.

Out of the light beams emitted via the liquid crystal panels 441, the three light exiting-side polarizers 443 each pass the polarized lights of a predetermined direction, e.g., light beam whose polarization axis is orthogonal to the transmission axis of the light beam in the light incident-side polarizer 442, and absorb the remaining lights.

The cross dichroic prism 444 forms a color image by combining the modulated lights provided by each of the light exiting-side polarizers 443. This cross dichroic prism 444 is shaped substantially like a square in planar view, i.e., as a result of affixation of four right-angled prisms. On the interface where the four right-angled prisms are affixed together, two dielectric multi-layer films are formed. These dielectric multi-layer films pass through color lights emitted from the liquid crystal panel 441G via the corresponding light exiting-side polarizer 443, and reflects color lights emitted from the liquid crystal panels 441R and 441B via their corresponding light exiting-side polarizers 443. As such, an image light as a result of combination of the lights of red, green, and blue is formed.

The optical-member chassis 45 is shaped like a box made of synthetic resin. The optical-member chassis 45 is set therein with the predetermined illumination optical axis A, and includes the above-described components 41 to 44 at their predetermined positions with respect to the illumination optical axis A.

The projection lens 46 is a projection optical device that magnifies and projects the image light formed by the light modulation device 44. This projection lens 46 is configured as assorted lenses in which a lens barrel 412 carries therein a plurality of lenses, e.g., Fresnel lens 461 or others positioned at the tip end side in the projection direction. In this embodiment, even if the image light is shorter in projection distance compared with any previous projector, the projection area of the same size as the previous projector can be implemented. For implementing the projection area of the size same as that of the previous projector even if with the shorter projection distance, the Fresnel lens 461 is configured larger in diameter than the lens barrel 462. The lens barrel 462 of this projection lens 46 is provided with the knob 463 (refer to FIGS. 1 and 2) that is exposed via the opening 2113 (refer to FIG. 1) so that zooming and focus adjustment can be manually performed.

Configuration of Retention Member

Figure 4:
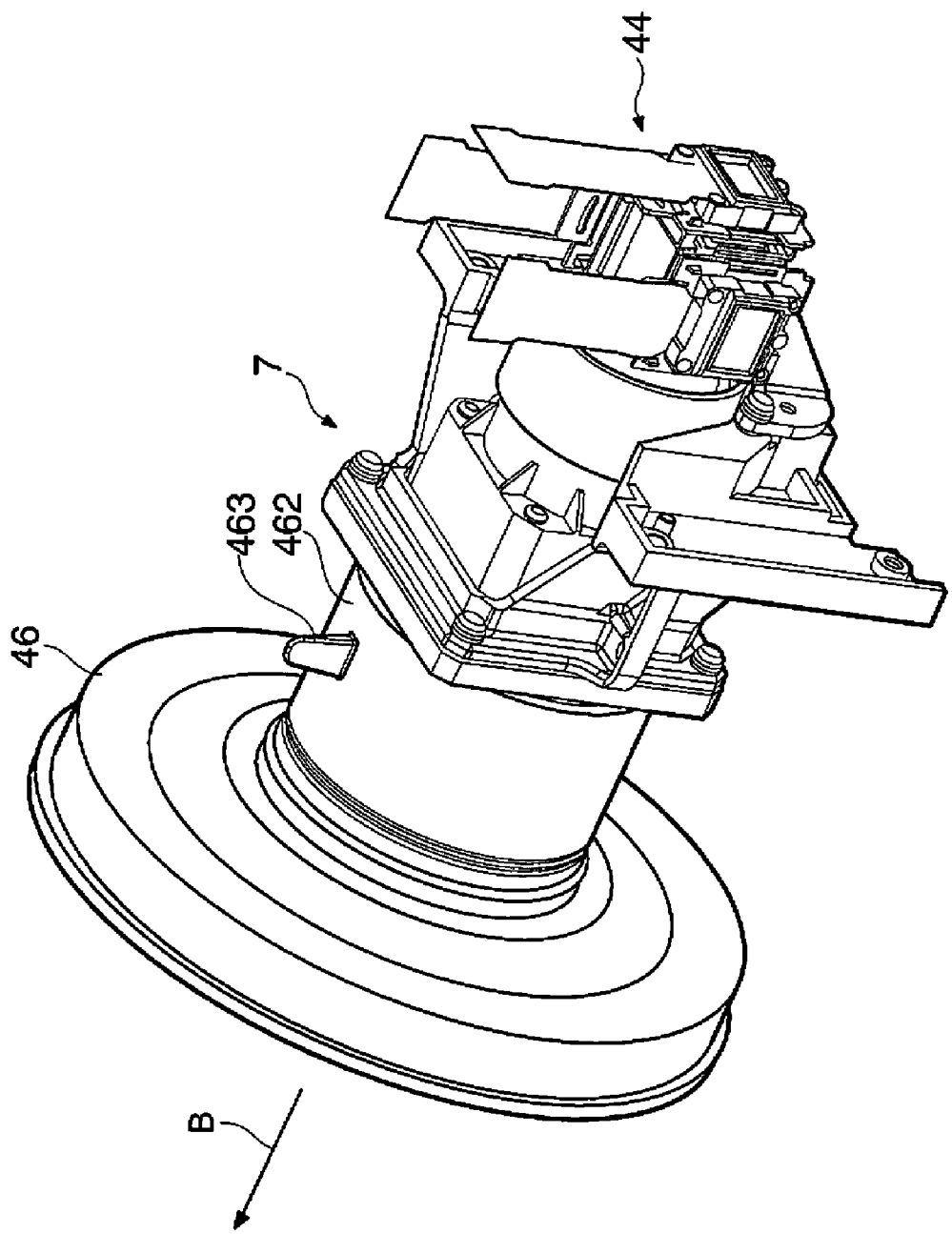
FIG. 4 is a perspective view of a light modulation device, that of a projection lens, and that of a retention member in the embodiment.
Figure 5:
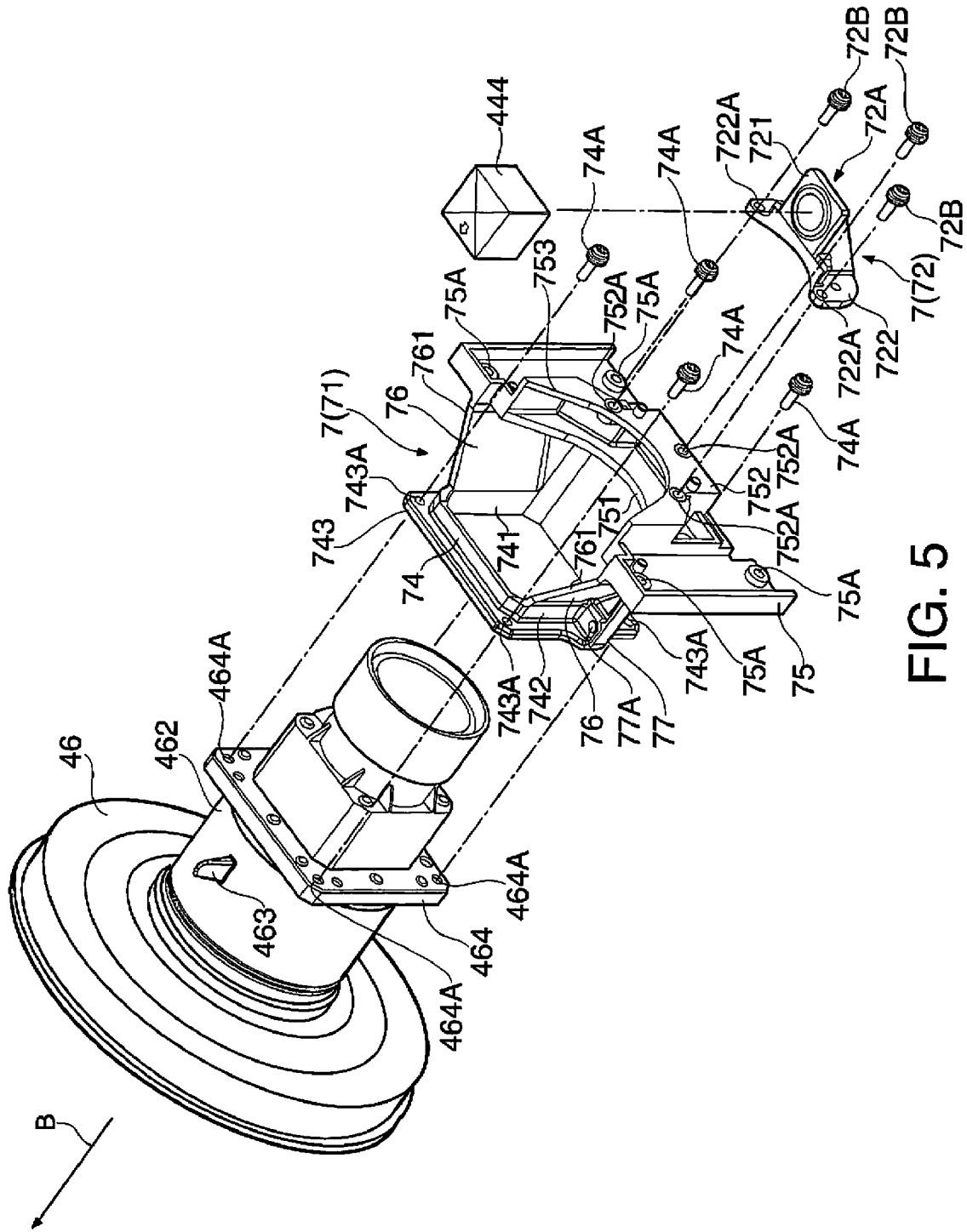
FIG. 5 is an exploded perspective view of the light modulation device, that of the projection lens, and that of the retention member in the embodiment.

FIG. 4 is a perspective view of the light modulation device 44, the projection lens 46, and the retention member 7. FIG. 5 is an exploded perspective view of the light modulation device 44, the projection lens 46, and the retention member 7.

As shown in FIG. 4, the light modulation device 44 and the projection lens 46 are retained by the retention member 7 in such a manner that the space therebetween is kept substantially constant, and their optical axes substantially match.

Herein, as shown in FIG. 5, the lens barrel 462 of the projection lens 46 is fixed with, substantially at the center, a flange 464. At the position substantially the center of gravity of the projection lens 46, the flange 464 is extended in a direction substantially orthogonal to an optical-axis direction B of the projection lens 46. The flange 464 is formed with, at each of the four corner portions, a screw hole 464A along the optical-axis direction B.

The retention member 7 is configured to include a projection lens attachment section 71, and a prism attachment section 72. The projection lens attachment section 71 is provided for attachment of the projection lens 46, and the prism attachment section 72 is provided for attachment of the cross dichroic prism 444 in the light modulation device 44. The projection lens attachment section 71 is configured separately from the prism attachment section 72.

The projection lens attachment section 71, as the projection optical device attachment section, is configured to include a fixing section 74, an opposing section 75, a connection section 76, and an extension section 77. The fixing section 74 serves to fix the projection lens 46, and the opposing section 75 is disposed opposing the fixing section 74 in the optical-axis direction B. The connection section 76 connects together the fixing section 74 and the opposing section 75. The extension section 77 is extended laterally from the fixing section 74 and the connection section 76 in the direction substantially orthogonal to the optical-axis direction B.

The fixing section 74 is shaped substantially like a rectangular frame including two sides 741 and 742 directed along the vertical direction. In the fixing section 74, the peripheral edge at the tip end side in the optical-axis direction B, i.e., luminous-flux exiting side, is formed with a collar section 743 extending toward the outside in the direction substantially orthogonal to the optical-axis direction B. The collar section 743 is formed with, at each of the four corner positions respectively opposing the screw holes 464A of the flange 464, a through hole 743A to go through in the optical-axis direction B. The fixing section 74 is fixed to the flange 464 by four screws 74A being respectively screw-fixed to the screw holes 464A via the through holes 743A. That is, the projection lens 46 is attached to the projection lens attachment section 71 by being screw-fixed along the optical-axis direction B. Because the flange 464 is extending in the direction substantially orthogonal to the optical-axis direction B of the projection lens 46 at the position substantially the center of gravity of the projection lens 46, the fixing section 74 fixes the projection lens 46 at the position substantially the center of gravity.

The opposing section 75 is a portion shaped substantially like a rectangular plate formed with a concave section 751 substantially at the center position. The concave section 751 looks like substantially U-shape, and is used for placing thereon the lens barrel 462 of the projection lens 46. At the four corner positions of the opposing section 75, through holes 75A are respectively formed by going through in the optical-axis direction B. The opposing section 75 is fixed to the optical-member chassis 45 by being screw-fixed by four screws (not shown) via the through holes 75A, respectively. The opposing section 75 is provided with a support section 752 shaped substantially flat. The support section 752 protrudes to the base end side in the optical-axis direction B, i.e., luminous-flux entering side, and supports the prism attachment section 72. The support section 752 is disposed opposing the fixing section 74 with respect to the optical-axis direction B, and is formed with a concave section 753 substantially at the center position for placing of the lens barrel 462 together with the concave section 751. At the three positions of the concave section 753, i.e., right and left sides, and the lower side, screw holes 752A are respectively formed along the optical-axis direction B.

The connection section 76 is a portion looked substantially like a rectangular plate, and is so formed that the dimension thereof is increased from the side of the fixing section 74 toward the side of the opposing section 75 when viewed in the vertical direction. The dimension of the connection section 76 on the side of the opposing section 75 is so set as to be substantially the same as the width of the upper end of the support section 752, and is so set as to be smaller than the dimension of the through hole 75A of the opposing section 75 located on the upper side in the vertical direction. That is, the connection section 76 is a portion for connecting together the fixing section 74 and the support section 752. The connection section 76 extends from the two sides 741 and 742 of the fixing section 74 to the side of the support section 752, and has a side 761 connecting together the upper end of the fixing section 74 and the upper end of the support section 752.

The extension section 77 is a portion shaped substantially like a trapezoidal plate laterally extending from the two sides 741 and 742 of the fixing section 74 and from the position substantially center of the connection section 76 in the direction substantially orthogonal to the optical-axis direction B. At the corner portion of the fixing section 74 on the side of the collar section 743, a through hole 77A is formed to go through in the vertical direction. The retention member 7 is fixed to the external chassis 2 by being screw-fixed by two screws (not shown) via the through hole 77A.

The prism attachment section 72 as the light modulation device attachment section is shaped substantially like a triangular prism having an attaching surface 721 for attachment of the cross dichroic prism 444. In the prism attachment section 72, at the position opposing any of the screw holes 752A formed at the lower side of the concave section 753 of the support section 752, a through hole 72A (not shown) is formed to go through in the optical-axis direction B. The prism attachment section 72 is formed with, at an end edge of the surface on the side of the support section 752 substantially orthogonal to the affixing surface 721, the collar section 722 laterally extending in the direction substantially orthogonal to the optical-axis direction B. This collar section 722 is formed with through holes 722A at the positions respectively opposing the two of the screw holes 752A to go through in the optical-axis direction B. The two of the screw holes 752A are formed on the right and left sides of the concave section 753 of the support section 752.

The prism attachment section 72 is fixed to the support section 752 by screwing three screws 72B to the screw holes 752A via the through holes 72A and 722A. That is, the prism attachment section 72 is supported by the support section 752 by being screw-fixed along the optical-axis direction B. The prism attachment section 72 is provided to the retention member 7 by being protruding to the side opposite to the projection lens 46 along the optical-axis direction B.

Figure 6A:
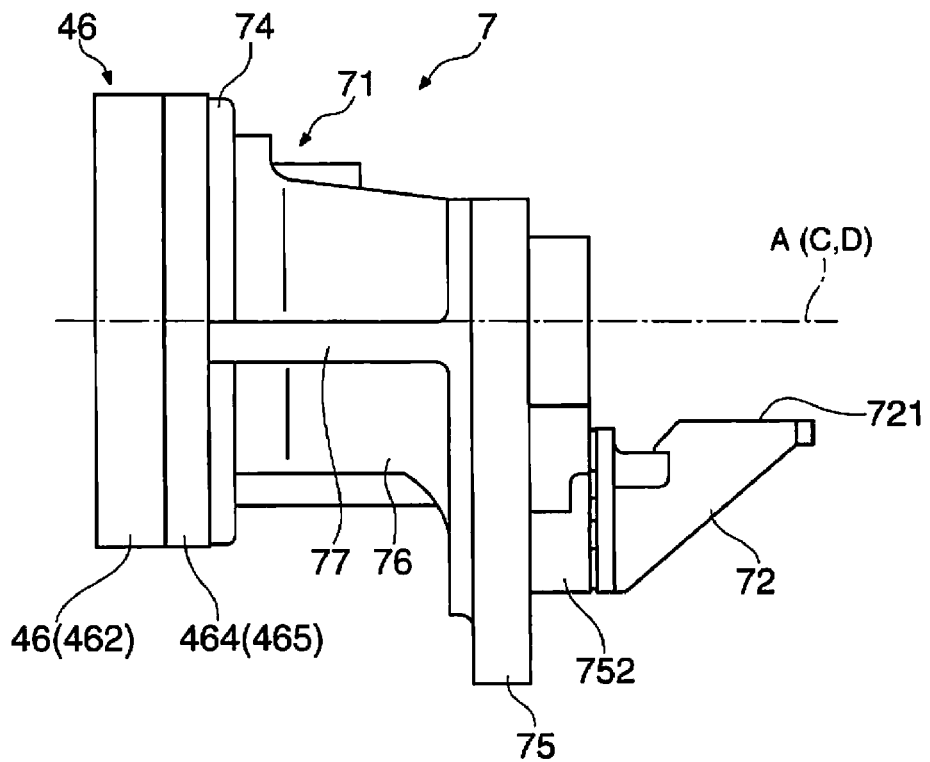
FIG. 6A is a side view of the retention member in the embodiment with no deformation.
Figure 6B:
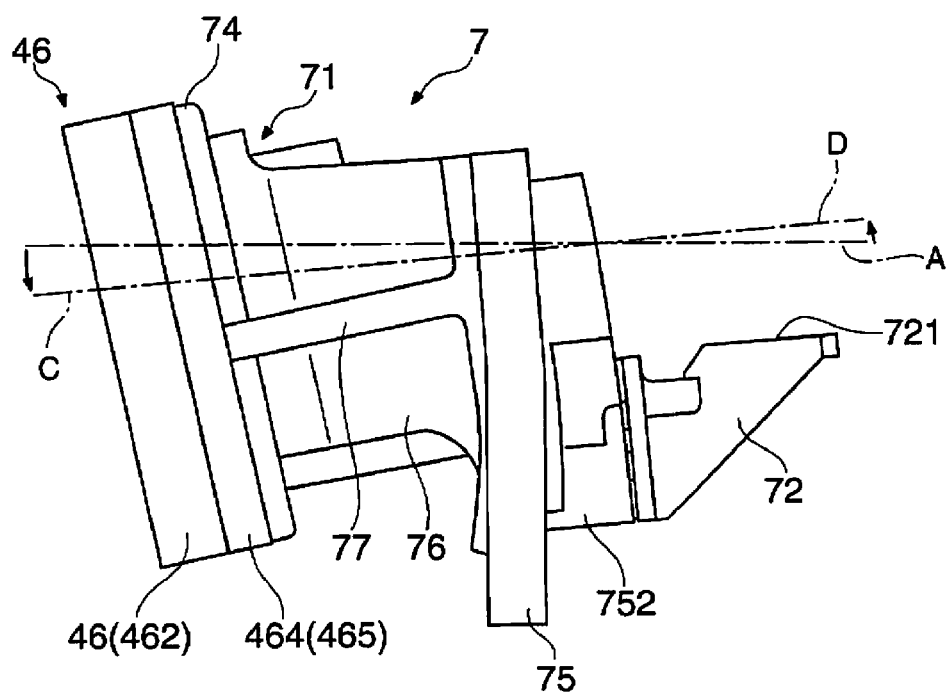
FIG. 6B is a side view of the retention member in the embodiment with some deformation.

FIG. 6A is a side view of the retention member 7 with no deformation, and FIG. 6B is a side view of the retention member 7 with some deformation. Note that FIGS. 6A and 6B both show no tip end portion of the projection lens 46.

As shown in FIG. 6A, while being free from deformation, the retention member 7 keeps substantially constant the space between the cross dichroic prism 444 (refer to FIG. 5) and the projection lens 46, and along the illumination optical axis A, finds a substantial matching between an optical axis C of the projection lens 46 and an optical axis D of the light modulation device 44 (refer to FIG. 4) attached to the prism attachment section 72.

When a force is applied to the fixing section 74 due to the self weight of the projection lens 46 or an impact applied to the projector 1, e.g., a force of pulling the upper end of the fixing section 74 to the tip end side of the projection lens 46 in the projection direction (left side in FIGS. 6A and 6B), as shown in FIG. 6B, the fixing section 74 is deformed, and the optical axis C of the projection lens 46 is tilted with respect to the illumination optical axis A. At this time, the force applied to the fixing section 74 is transmitted to the opposing section 75 and the support section 752 via the connection section 76. With the transmission of the force applied to the fixing section 74 as such, the upper end of the opposing section 75 is pulled to the tip end side of the projection lens 46 in the projection direction. Herein, as is fixed to the optical-member chassis 45 (refer to FIG. 3) via the through holes 75A, the opposing section 75 is so deformed that only the upper end thereof is bent toward the tip end side of the projection lens 46 in the projection direction.

When the force applied to the fixing section 74 is transmitted, the upper end of the support section 752 is pulled toward the tip end side of the projection lens 46 in the projection direction, thereby being deformed due to the deformation of the fixing section 74. When the support section 752 is deformed as such, the prism attachment section 72 being fixed to the support section 752 is also deformed due to the deformation of the support section 752. Accordingly, the optical axis D of the light modulation device 44 is tilted with respect to the illumination optical axis A, and is substantially matched with the optical axis C of the projection lens 46 that has been tilted due to the deformation of the fixing section 74.

According to the projector 1 of the embodiment, the following effects can be achieved.

1. The retention member 7 is provided with the projection lens attachment section 71 and the prism attachment section 72, and the projection lens attachment section 71 is provided with the fixing section 74, the support section 752, and the connection section 76. As such, even if the fixing section 74 is deformed due to the self weight of the projection lens 46 or any impact applied to the projector 1, for example, the prism attachment section 72 can follow the deformation of the fixing section 74 via the connection section 76 and the support section 752. This thus enables to keep substantially constant the space between the light modulation device 44 and the projection lens 46, and to substantially match their optical axes C and D.

2. The fixing section 74 fixes the projection lens 46 substantially at a position of the center of gravity. This thus can reduce any force to be applied to the fixing section 74 by the self weight of the projection lens 46 or by any impact applied to the projector 1, for example, so that the amount of deformation of the fixing section 74 can be favorably reduced.

The connection section 76 is formed substantially like a rectangular plate which one side is directed along the vertical direction, and the side 761 connects the upper end of the fixing section 74 and the upper end of the support section 752, thereby being able to transmit the force applied on the upper end of the fixing section 74 to the support section 752 without fail. This thus enables, without fail, the prism attachment section 72 to follow any deformation of the fixing section 74 via the support section 752 so that the space can be kept substantially constant between the light modulation device 44 and the projection lens 46, and their optical axes C and D can be substantially matched.

4. The projection lens 46 is screw-fixed to the fixing section 74 along the optical-axis direction B, thereby being able to keep substantially constant the space between the light modulation device 44 and the projection lens 46.

5. The projection lens attachment section 71 is configured separately from the prism attachment section 72. Therefore, after being attached with the light modulation device 44, the prism attachment section 72 can be supported by the support section 752 in the projection lens attachment section 71. As such, the retention member 7 can be increased in manufacturing efficiency, and by extension, the optical device 4 can be increased in manufacturing efficiency.

6. The prism attachment section 72 is screw-fixed to the support section 752 along the optical-axis direction B, thereby being able to keep substantially constant the space between the light modulation device 44 and the projection lens 46.

7. The projector 1 is provided with the optical device 4, and the projector 1 can be thus prevented from being deteriorated in optical capabilities.

MODIFIED EXAMPLE OF EMBODIMENT

While the invention has been described in detail, the foregoing description is in all aspects illustrative and not restrictive. It is understood that numerous other modifications and variations can be devised without departing from the scope of the invention.

In the embodiment above, the fixing section 74 is formed like a rectangular frame having two sides directed along the vertical direction. This is surely not restrictive, and the fixing section 74 may be formed like a cylindrical tube. That is, the fixing section 74 serves well as long as it is fixed at the position substantially the center of gravity in the projection optical device.

In the embodiment above, the connection section 76 is formed substantially like a rectangular plate having the side 761 connecting together the upper end of the fixing section 74 and the upper end of the support section 752. This is surely not restrictive, and the connection section 76 may be shaped like a rod connecting together the fixing section and the support section at their substantially center portions. That is, the connection section 76 serves well as long as it connects at least partially together the fixing section and the support section.

In the embodiment above, in the retention member 7, the projection lens attachment section 71 is separately configured from the prism attachment section 72. Alternatively, these may be configured integrally.

In the embodiment above, the projection lens 46 is fixed to the fixing section 74 by being screw-fixed along the optical-axis direction B, and the prism attachment section 72 is configured integrally with the projection lens attachment section 71 by being screw-fixed along the optical-axis direction B. Alternatively, the optical-axis direction B is surely not the only direction for screwing, and any other direction will also do.

In the embodiment above, in the retention member 7, the opposing section 75 is fixed to the optical-member chassis 45, and the extension section 77 is fixed to the external chassis 2. Alternatively, instead of fixing the opposing section 75 to the optical-member chassis 45, only the extension section 77 may be fixed to the external chassis 2. That is, for fixation of the retention member to the chassis of the optical device or to the external chassis such as projector equipped with the optical device, any portion not the light modulation device attachment section may be used.

In the embodiment above, the optical device 4 looks substantially like a letter L in planar view. This is surely not the only option, and the optical device 4 may be shaped substantially like a U-shape in planar view.

In the embodiment above, the light modulation device 44 is provided with three liquid crystal panels 441R, 441G, and 441B. This is surely not restrictive, and the invention is applicable to a projector including two or less or four or more liquid crystal panels. If with a projector including only one liquid crystal panel, the dichroic prism 444 is not necessarily provided, and if this is the configuration, the prism attachment section 72 may be attached with the liquid crystal panel 441.

In the embodiment above, the liquid crystal panels 441 are each of a transmission type. Alternatively, the liquid crystal panel may be of a reflection type, or a digital micromirror device (DMD) may be used. If this is the configuration, the light incident-side polarizers 442 and the light exiting-side polarizers 443 may not be necessarily provided. Moreover, similarly to the projector using the liquid crystal panels as above, the invention is surely applicable to a projector using two or less or four or more DMDs. Note that "DMD" is the trademark of Texas Instruments Incorporated.

The aspects of the invention are applicable to an optical device, and especially can be suitably applied to a projector equipped with an optical device.

The entire disclosure of Japanese Patent Application No. 2007-254565, filed Sep. 28, 2007 is expressly incorporated by reference herein.

What is claimed is:

1. An optical device comprising:
    a light source;
    a light modulation device that modulates a light beam emitted from the light source to an image light in accordance with image information;
    a projection optical device that magnifies and projects the image light; and
    a retention member configured to hold the light modulation device and the projection optical device, including:
        a projection optical device attachment section for attaching the projection optical device, and
        a light modulation device attachment section provided for attaching the light modulation device with a protrusion to a side opposite to the projection optical device along an optical-axis direction of the projection optical device,
    wherein:
        the projection optical device attachment section includes:
            a fixing section that fixes the projection optical device substantially at a position of the center of gravity;
            a support section that is disposed opposing the fixing section in the optical-axis direction, and supports the light modulation device attachment section such that the light modulation device attachment section is fixed to a side of the support section that is opposite the fixing section in the optical-axis direction; and
            a connection section that connects together the fixing section and the support section,
        the support section is formed with a concave section, and
        the light modulation device attachment section is formed with a collar section,
        the collar section being fixed to at least two places of both sides of the concave portion by screw.

2. The optical device according to claim 1, wherein
the fixing section is shaped substantially like a rectangular frame having two sides directed along a vertical direction, and
the connection section extends from the two sides to a side of the support section, and is formed substantially like a rectangular plate having a side connecting together an upper end of the fixing section and an upper end of the support section.

3. The optical device according to claim 1, wherein
the projection optical device is fixed to the fixing section by being screw-fixed along the optical-axis direction.

4. The optical device according to claim 1, wherein
the light modulation device attachment section is configured separately from the projection optical device attachment section.

5. The optical device according to claim 4, wherein
the light modulation device attachment section is supported by the support section by being screw-fixed along the optical-axis direction.

6. A projector, comprising the optical device of claim 1.

7. The projector according to claim 6, wherein
the fixing section is shaped substantially like a rectangular frame having two sides directed along a vertical direction, and
the connection section extends from the two sides to a side of the support section, and is formed substantially like a rectangular plate having a side connecting together an upper end of the fixing section and an upper end of the support section.

8. The projector according to claim 6, wherein
the projection optical device is fixed to the fixing section by being screw-fixed along the optical-axis direction.

9. The projector according to claim 6, wherein
the light modulation device attachment section is configured separately from the projection optical device attachment section.

10. The projector according to claim 9, wherein
the light modulation device attachment section is supported by the support section by being screw-fixed along the optical-axis direction.

* * * * *